US011226233B2

(12) United States Patent
Furukawa et al.

(10) Patent No.: US 11,226,233 B2
(45) Date of Patent: Jan. 18, 2022

(54) CONFOCAL MEASURING APPARATUS

(71) Applicant: OMRON Corporation, Kyoto (JP)

(72) Inventors: Shinya Furukawa, Fukuchiyama (JP);
Takahiro Suga, Fukuchiyama (JP);
Hiroaki Takimasa, Ayabe (JP)

(73) Assignee: OMRON Corporation, Kyoto (JP)

( * ) Notice: Subject to any disclaimer, the term of this patent is extended or adjusted under 35 U.S.C. 154(b) by 279 days.

(21) Appl. No.: 15/846,204

(22) Filed: Dec. 19, 2017

(65) Prior Publication Data
US 2018/0252582 A1     Sep. 6, 2018

(30) Foreign Application Priority Data

Mar. 2, 2017  (JP) .............................. JP2017-039087

(51) Int. Cl.
*H01L 27/00*  (2006.01)
*G01J 3/28*  (2006.01)
(Continued)

(52) U.S. Cl.
CPC .......... *G01J 3/2803* (2013.01); *G01B 11/026* (2013.01); *G01B 11/14* (2013.01);
(Continued)

(58) Field of Classification Search
CPC ...... G01J 3/0248; G01J 3/0237; G01J 3/0278; G01J 3/06; G01J 3/10; G01J 3/0218;
(Continued)

(56) References Cited

U.S. PATENT DOCUMENTS 5,452,382 A  *  9/1995  Shionoya ............. G01B 11/306
                                                        359/368
6,181,474 B1 *  1/2001  Ouderkirk .......... G02B 21/0052
                                                        250/252.1
(Continued)

FOREIGN PATENT DOCUMENTS

CN          104374324         2/2015
CN          104995480        10/2015
(Continued)

OTHER PUBLICATIONS

"Office Action of China Counterpart Application," with English translation thereof, dated Dec. 4, 2019, p. 1-p. 12.
(Continued)

*Primary Examiner* — Georgia Y Epps
*Assistant Examiner* — Kevin Wyatt
(74) *Attorney, Agent, or Firm* — JCIPRNET

(57) ABSTRACT

A confocal measuring apparatus (1) includes a light source (10), an optical system (30) configured to receive reflected light from a measurement surface, a light guide part (20) into which a plurality of cores including a first core (26) and a second core (28) is built and configured to propagate the reflected light by the plurality of cores, a displacement amount measurement part (40) including a spectroscope (42) configured to separate the reflected light propagated by the first core into each wavelength components and a detector (44) having a plurality of light receiving elements arranged to correspond to a spectral direction by the spectroscope, and a peripheral image measurement part (60) configured to form an image of the reflected light propagated by the second core on the plurality of image pickup elements and to generate a peripheral image with respect to a measurement position of the measurement surface.

8 Claims, 4 Drawing Sheets

(51) Int. Cl.
    *G01J 3/10*     (2006.01)
    *G01J 3/02*     (2006.01)
    *G01B 11/26*     (2006.01)
    *G01B 11/14*     (2006.01)
    *G01J 3/06*     (2006.01)
    *G01B 11/02*     (2006.01)
    *G02B 6/32*     (2006.01)
    *G02B 6/02*     (2006.01)

(52) U.S. Cl.
    CPC ............ *G01B 11/26* (2013.01); *G01J 3/0218* (2013.01); *G01J 3/0237* (2013.01); *G01J 3/0248* (2013.01); *G01J 3/0278* (2013.01); *G01J 3/06* (2013.01); *G01J 3/10* (2013.01); *G02B 6/02042* (2013.01); *G02B 6/32* (2013.01)

(58) Field of Classification Search
    CPC ...... G01J 3/2803; G01B 11/26; G01B 11/026; G01B 11/14; G02B 6/04
    USPC .................................. 250/227.11, 208.1, 227
    See application file for complete search history.

(56) References Cited

U.S. PATENT DOCUMENTS

| | | | | |
|---|---|---|---|---|
| 6,429,968 | B1 * | 8/2002 | Carver | G01J 3/02 250/458.1 |
| 6,663,560 | B2 * | 12/2003 | MacAulay | G02B 21/0028 359/298 |
| 8,369,669 | B2 * | 2/2013 | Bouma | G02B 6/02042 385/116 |
| 9,435,982 | B2 * | 9/2016 | Ishihara | G02B 7/16 |
| 2003/0076571 | A1 | 4/2003 | MacAulay et al. | |
| 2007/0064238 | A1 * | 3/2007 | Fujita | G02B 21/0056 356/479 |
| 2007/0165220 | A1 * | 7/2007 | Brady | G01J 3/02 356/310 |
| 2011/0273718 | A1 | 11/2011 | Bouma et al. | |
| 2016/0011075 | A1 * | 1/2016 | Maluck | G01J 3/28 356/125 |
| 2018/0259390 | A1 * | 9/2018 | Marukawa | G01J 3/2803 |

FOREIGN PATENT DOCUMENTS

| | | |
|---|---|---|
| CN | 105938196 | 9/2016 |
| JP | 4995720 | 8/2012 |
| JP | 2012-208102 | 10/2012 |
| JP | 2014-197004 | 10/2014 |
| JP | 2015-052805 | 3/2015 |
| JP | 2016080494 | 5/2016 |

OTHER PUBLICATIONS

"Office Action of Korea Counterpart Application," with English translation thereof, dated Nov. 14, 2019, p. 1-p. 8.

* cited by examiner

CONFOCAL MEASURING APPARATUS

CROSS-REFERENCE TO RELATED APPLICATION

This application claims the priority of Japan patent application serial no. 2017-039087, filed on Mar. 2, 2017. The entirety of the above-mentioned patent application is hereby incorporated by reference herein and made a part of this specification.

BACKGROUND

Technical Field

The disclosure relates to a measuring apparatus for measuring a displacement amount of an object to be measured using a confocal optical system, and more particularly to a measuring apparatus capable of allowing a user to check a peripheral image with respect to a measurement point.

Description of Related Art

A confocal measuring apparatus capable of measuring a displacement of an object to be measured using a confocal optical system is known as a conventional technique. For example, Japanese Unexamined Patent Application Publication No. 2012-208102 (published on Oct. 25, 2012) discloses a confocal measuring apparatus in which an objective lens and a diffractive lens are appropriately arranged to minimize fluctuation in accuracy of measuring a displacement of an object to be measured due to a wavelength of light. Further, Japanese Unexamined Patent Application Publication No. 2015-52805 (published on Mar. 19, 2015) discloses a confocal microscope system in which ultra-depth image data is generated on the basis of pixel data adjusted according to sensitivity parameters and high resolution image data of an object to be observed is also generated. Meanwhile, a measuring apparatus for notifying a user of a measurement position of an object to be measured when the object to be measured is measured is also known as a conventional technique. For example, Japanese Unexamined Patent Application Publication No. 2014-197004 (published on Oct. 16, 2014) discloses an image measuring apparatus in which an edge with respect to a measurement position with respect to an image of an object to be measured is detected and a measurement result of a predetermined physical amount on the basis of the detected edge portion is displayed.

However, in a measuring apparatus using a confocal optical system, it is necessary to visually check the measurement position in order for the user to confirm the measurement position. Therefore, for example, in a case in which a measurement range is a minute region and a case in which the periphery of the measurement position are hidden in a shadow of a sensor head, it is difficult for the user to accurately ascertain the measurement position. Further, when the configuration of the Japanese Unexamined Patent Application Publication No. 2014-197004 (published on Oct. 16, 2014) is applied to a measuring apparatus using a confocal optical system, a size of the sensor head is increased due to the addition of an image pickup device, and heat generation in the image pickup device also affects the measurement, which may cause difficulty in accurate measurement. Specifically, due to the heat generation in the image pickup device, chromatic aberration on an optical axis in a chromatic aberration unit of the sensor head may be affected.

SUMMARY

In an aspect of an embodiment of the invention, a convenient confocal measuring apparatus is provided, and the confocal measuring apparatus is capable of allowing checking of a peripheral image with respect to a measurement position without being influenced by a relative position between a sensor head and a measurement surface.

A confocal measuring apparatus according to one aspect of an embodiment of the invention includes a light source, an optical system disposed with respect to irradiation light from the light source, and configured to irradiate an object to be measured with irradiation light and to receive reflected light from a measurement surface of the object to be measured, a light guide part in which a plurality of cores including a first core and a second core is built and configured to propagate the reflected light incident to the optical system by the plurality of cores, a displacement amount measurement part including a spectroscope configured to separate the reflected light propagated by the first core into each of wavelength components and a detector having a plurality of light receiving elements arranged to correspond to a spectral direction of the spectroscope, and a peripheral image measurement part including a plurality of image pickup elements and configured to form an image of the reflected light propagated by the second core on the plurality of image pickup elements and to generate a peripheral image with respect to a measurement position on the measurement surface.

In the confocal measuring apparatus according to one aspect of an embodiment of the invention, the displacement amount measurement part may calculate a distance from the optical system to the measurement surface of the object to be measured on the basis of a detection result of the detector.

In the confocal measuring apparatus according to one aspect of an embodiment of the invention, the confocal measuring apparatus may further include an image processing part configured to calculate a degree of inclination of the measurement surface on the basis of a distribution of an intensity for each wavelength of the reflected light incident to each of the plurality of image pickup elements in an image formed on the plurality of image pickup elements by the peripheral image measurement part.

The confocal measuring apparatus according to one aspect of an embodiment of the invention may further include a movable part and a control part. The movable part is movable with respect to a relative position of the light guide part. The control part is configured to control movement of the movable part such that the first core is selected from among the plurality of cores.

According to one aspect of an embodiment of the invention, the confocal measuring apparatus can obtain the distribution of the intensity of the reflected light and the peripheral image with respect to the measurement position of the measurement surface using the reflected light. Therefore, the user can confirm whether or not an intended position on the measurement surface has been measured. Further, since the peripheral image with respect to the measurement position is generated on the basis of the reflected light propagated through the second core, there is no restriction necessary for obtaining the peripheral image. Accordingly, even when the distance between the sensor head and the measurement surface is short and the periphery of the measurement position is hidden in the shadow of the sensor head, the peripheral image with respect to the measurement position can be obtained. Therefore, it is possible to provide a convenient confocal measuring apparatus capable of confirming the peripheral image with respect to the measurement position without being influenced by the relative position between the sensor head and the measurement surface.

DESCRIPTION OF THE EMBODIMENTS

First Embodiment

Figure 1:
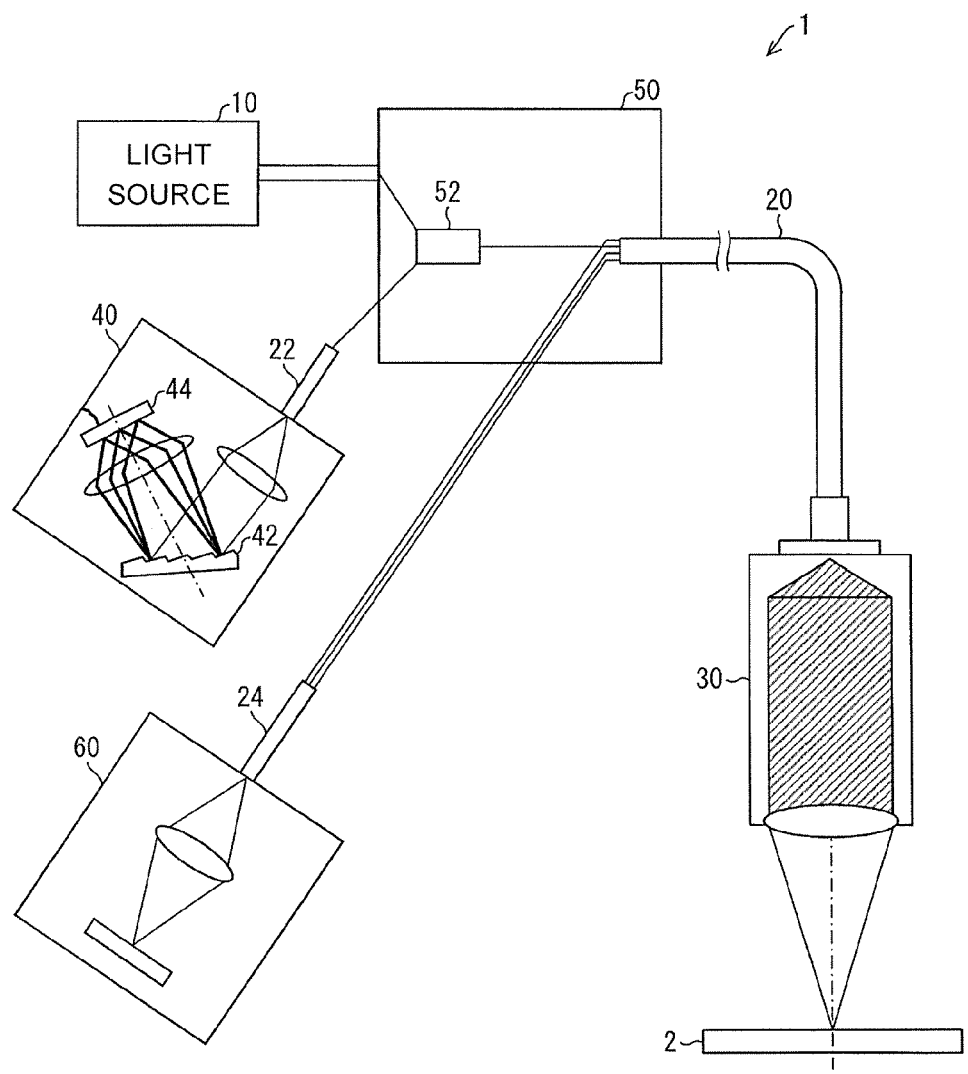
FIG. 1 is a schematic view illustrating an example of a confocal measuring apparatus according to a first embodiment of the invention.
Figure 2:
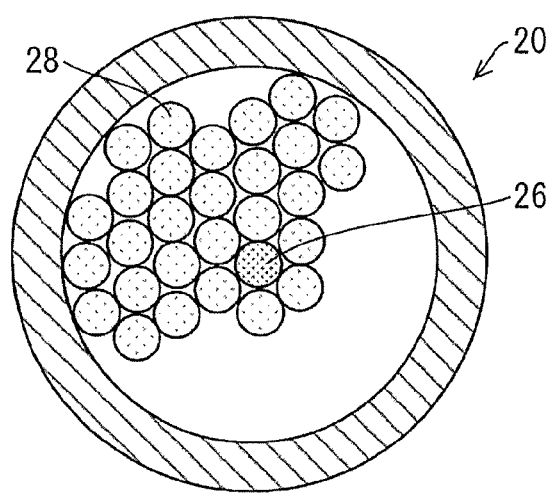
FIG. 2 is a schematic view illustrating a cross section of a light guide part according to the first embodiment of the invention.

Hereinafter, a first embodiment of the invention will be described in detail with reference to FIGS. 1 and 2. FIG. 1 is a schematic view illustrating an example of a confocal measuring apparatus according to a first embodiment of the invention.

Configuration of Confocal Measuring Apparatus 1

A configuration of a confocal measuring apparatus 1 according to the embodiment will be described with reference to FIG. 1. FIG. 1 is a schematic view illustrating an example of an apparatus configuration of the confocal measuring apparatus 1 according to the embodiment.

The confocal measuring apparatus 1 may irradiate a measurement surface of an object 2 to be measured with light and may calculate a distance from an optical system which receives reflected light to a measurement position using the reflected light from the measurement surface when the irradiation light is focused at the measurement position (hereinafter, referred to as a measurement point) on the measurement surface. Specifically, the confocal measuring apparatus 1 may calculate the distance from the optical system to the measurement point on the basis of the reflected light which has passed through a pinhole in the reflected light. The confocal measuring apparatus 1 may further capture a peripheral image with respect to the measurement point. The confocal measuring apparatus 1 includes a light source 10, a light guide part 20, a displacement amount measurement core 22, a peripheral image measurement core 24, a sensor head 30, a displacement amount measurement part 40, a spectroscope 42, a detector 44, a fiber core selection part 50, a coupler 52, and a peripheral image measurement part 60.

The light source 10 causes irradiation light having light with a plurality of wavelengths to be incident to the fiber core selection part 50. For example, the light source 10 may be a white light emitting diode (LED) which generates white light.

The fiber core selection part 50 may cause the irradiation light incident from the light source 10 to be incident to the light guide part 20. The fiber core selection part 50 may cause reflected light, which is generated at the measurement point on the measurement surface of the object 2 to be measured and is incident to the light guide part 20, to be incident to each of the displacement amount measurement core 22 and the peripheral image measurement core 24 using the coupler 52.

The coupler 52 is a coupler having a multiplexing/demultiplexing structure and is optically connected to an input side cable, an output side cable and the light guide part 20. In the illustrated example, the coupler 52 is a 2×1 star coupler (2 inputs and 1 output/1 input and 2 outputs) corresponding to a Y-branch coupler. In the illustrated example, the irradiation light from the light source 10 is incident to the input side cable, passes through the coupler 52 and is then output to the light guide part 20. Further, a part of the reflected light from the measurement surface is incident to the coupler 52 and is output to the displacement amount measurement core 22 through the output side cable.

The light guide part 20 is a cable including a plurality of cores and has a configuration including, for example, a plurality of cores in one cable. The light guide part 20 may propagate the irradiation light generated by the light source 10 to the sensor head 30 via a plurality of built-in cores. The light guide part 20 may propagate the reflected light from the measurement surface of the measurement object 2, which is received by the sensor head 30, to the fiber core selection part 50 via the plurality of built-in cores. That is, the light guide part 20 is optically connected to the fiber core selection part 50 and the sensor head 30. A detailed configuration of the light guide part 20 including the plurality of cores will be described later.

The displacement amount measurement core 22 receives the light propagated through a specific core of the light guide part 20 in the reflected light from the measurement surface of the object 2 to be measured. The displacement amount measurement core 22 may output the received specific reflected light to the displacement amount measurement part 40. Further, the displacement amount measurement core 22 may be configured with a single core or a plurality of cores.

The peripheral image measurement core 24 receives light other than the light toward the displacement amount measurement core 22 in the reflected light from the measurement surface. Further, in an embodiment of the invention, it is preferable that the number of cores of the light guide part 20 be equal to a sum of the number of displacement amount measurement cores 22 and the number of peripheral image measurement cores 24.

With respect to the irradiation light from the light source 10, the sensor head 30 may generate chromatic aberration on an optical axis using a built-in chromatic aberration unit, may focus the irradiation light with a similarly built-in objective lens and then may irradiate the object 2 to be measured with the focused light. The sensor head 30 may receive the reflected light from the measurement surface of the object 2 to be measured and may propagate the reflected light to the light guide part 20. That is, the sensor head 30 operates as an optical system which is disposed with respect to the irradiation light from the light source 10, and the sensor head 30 irradiates the object 2 to be measured with the irradiation light and receives the reflected light from the measurement surface of the object 2 to be measured.

The displacement amount measurement part 40 receives the reflected light, which is propagated through the displacement amount measurement core 22, in the reflected light incident to the sensor head 30. The displacement amount measurement part 40 may separate the reflected light with respect to each of wavelength components and may detect an intensity of each wavelength component. For example, the displacement amount measurement part 40 may calculate a distance $d_i$ from the sensor head 30 to the measurement surface of the object 2 to be measured on the basis of a detection result of the detector 44.

The spectroscope 42 may separate the reflected light propagated through the displacement amount measurement core 22 into a plurality of reflected lights passing through the plurality of cores of the light guide part 20 with respect to each of wavelength components. The spectroscope 42 propagates the separated reflected light to the detector 44. For example, the spectroscope 42 may be a diffraction grating. Further, as long as the reflected light may be separated into each of wavelength components, any device may be adopted for the spectroscope 42 other than a diffraction grating.

The detector 44 detects the intensity of each wavelength component of the reflected light which is separated into each of wavelength components by the spectroscope 42. For example, the detector 44 may have a configuration in which a plurality of light receiving elements are arranged to correspond to a spectral direction of the spectroscope 42 and the detection results in the plurality of light receiving elements are output.

The peripheral image measurement part 60 receives the reflected light, which is propagated through the peripheral image measurement core 24, in the reflected light incident to the sensor head 30. The peripheral image measurement part 60 may generate the peripheral image with respect to the measurement point on the basis of the received reflected light. In the illustrated example, the peripheral image measurement part 60 may form an image on an appropriate image pickup surface using the received reflected light. For example, the peripheral image measurement part 60 may have a configuration in which the image pickup surface having a plurality of image pickup elements two-dimensionally arranged is provided and a peripheral image is generated from a detection result of the reflected light on the image pickup surface.

Configuration of Light Guide Portion 20

A detailed configuration of the light guide part 20 will be described with reference to FIG. 2. FIG. 2 is a schematic view illustrating a cross section of the light guide part 20.

In the illustrated example, a hatched annular portion illustrates a sheath of the entire light guide part 20. Further, the plurality of small circles illustrated inside the sheath illustrate each of the plurality of cores provided in the light guide part 20.

In the illustrated example, the light guide part 20 includes a first core 26 and a second core 28. The first core 26 and the second core 28 serve to propagate the reflected light from the measurement point. The reflected light from the measurement surface of the object 2 to be measured is propagated through the first core 26 and the second core 28. Additionally, in the fiber core selection part 50, only the reflected light propagated through the first core 26 is incident to the displacement amount measurement core 22 through the output cable of the coupler 52. On the other hand, the reflected light propagated through the second core 28 is incident to the peripheral image measurement core 24 and is output to the peripheral image measurement part 60. Accordingly, the light guide part 20 may distribute the reflected light from the measurement surface to be used for both of measurement of a displacement amount and measurement of a peripheral image with respect to the measurement point.

Further, in the illustrated example, although the first core 26 is configured with a single core, there is no limitation thereto. For example, the first core 26 may be configured with a plurality of cores. When the first core 26 is configured with a plurality of cores, it is possible to increase the accuracy of the distance $d_i$ by averaging a calculated value of the distance $d_i$ in each of the firstcores 26, since a radius of a measurement region increases. This is not suitable for measurement in a case in which the measurement range is a minute region. Further, the first core 26 is not necessarily disposed near a center of the light guide part 20, but to make it easier to obtain the peripheral image with respect to the measurement point, in an embodiment of the invention, it is preferable that it be disposed near the center of the light guide part 20.

Specific Example of Operation

In the embodiment, an operation of the confocal measuring apparatus 1 will be specifically described with reference to FIGS. 1 and 2.

First, when the light source 10 generates the irradiation light having a plurality of wavelengths by light emission, the irradiation light is propagated, in turn, through the input side cable and the coupler 5 and then is incident to the light guide part 20. The irradiation light is propagated through an inside of the light guide part 20 and is output from the objective lens to the measurement surface of the object 2 to be measured after the chromatic aberration on the optical axis is generated for each wavelength in the sensor head 30. At this time, in the irradiation light, only light having a specific wavelength is focused (spotted) on the measurement surface.

Next, the sensor head 30 receives the reflected light from the measurement surface on a light receiving surface of the objective lens. The reflected light is divided into reflected light propagated through the first core 26 and reflected light propagated through the second core 28 in the light guide part 20.

The reflected light propagated through the first core 26 is output into the fiber core selection part 50. Additionally, in the fiber core selection part 50, the reflected light is propagated, in turn, through the coupler 52, the output side cable and the displacement amount measurement core 22 and is output to the displacement amount measurement part 40. Further, in the displacement amount measurement part 40, the reflected light is separated into the wavelength components by the spectroscope 42, and then a peak of each wavelength component is detected by the detector 44. Accordingly, the distance $d_i$ between the light receiving surface of the sensor head 30 and the measurement point can be calculated on the basis of the reflected light from the measurement surface.

Meanwhile, the reflected light propagated through the second core 28 is propagated through the peripheral image measurement core 24 and is then output to the peripheral image measurement part 60. The peripheral image measurement part 60 may capture the peripheral image with respect to the measurement point on the basis of the reflected light.

Due to the above-described operation, the confocal measuring apparatus 1 according to the embodiment can obtain the distance $d_i$ between the light receiving surface of the sensor head 30 and the measurement point and the peripheral image with respect to the measurement point. Accordingly, the user can check the peripheral image with respect to the measurement point. Further, since the distance $d_i$ and the peripheral image with respect to the measurement point are obtained from the reflected light propagated through the light guide part 20, there is no need to perform additional processing on the object 2 to be measured. Therefore, it is possible to provide a confocal measuring apparatus 1 which can capture an image of the measurement position with a simple configuration.

In the confocal measuring apparatus 1 according to the embodiment, since the peripheral image measurement part 60 is disposed away from the sensor head 30 and the displacement amount measurement part 40, it is possible to minimize an influence (for example, measurement error based on temperature characteristics of the lens) of the heat generation in the image pickup element on the measurement.

Further, the confocal measuring apparatus 1 may output the distance $d_i$ between the light receiving surface of the sensor head 30 and the measurement point and the peripheral image with respect to the measurement point to the user. For example, a marker in the peripheral image with respect to the measurement point which indicates the measurement position of the distance $d_i$ may be output together with a corresponding image.

Second Embodiment

Configuration of Confocal Measuring Apparatus

Figure 3:
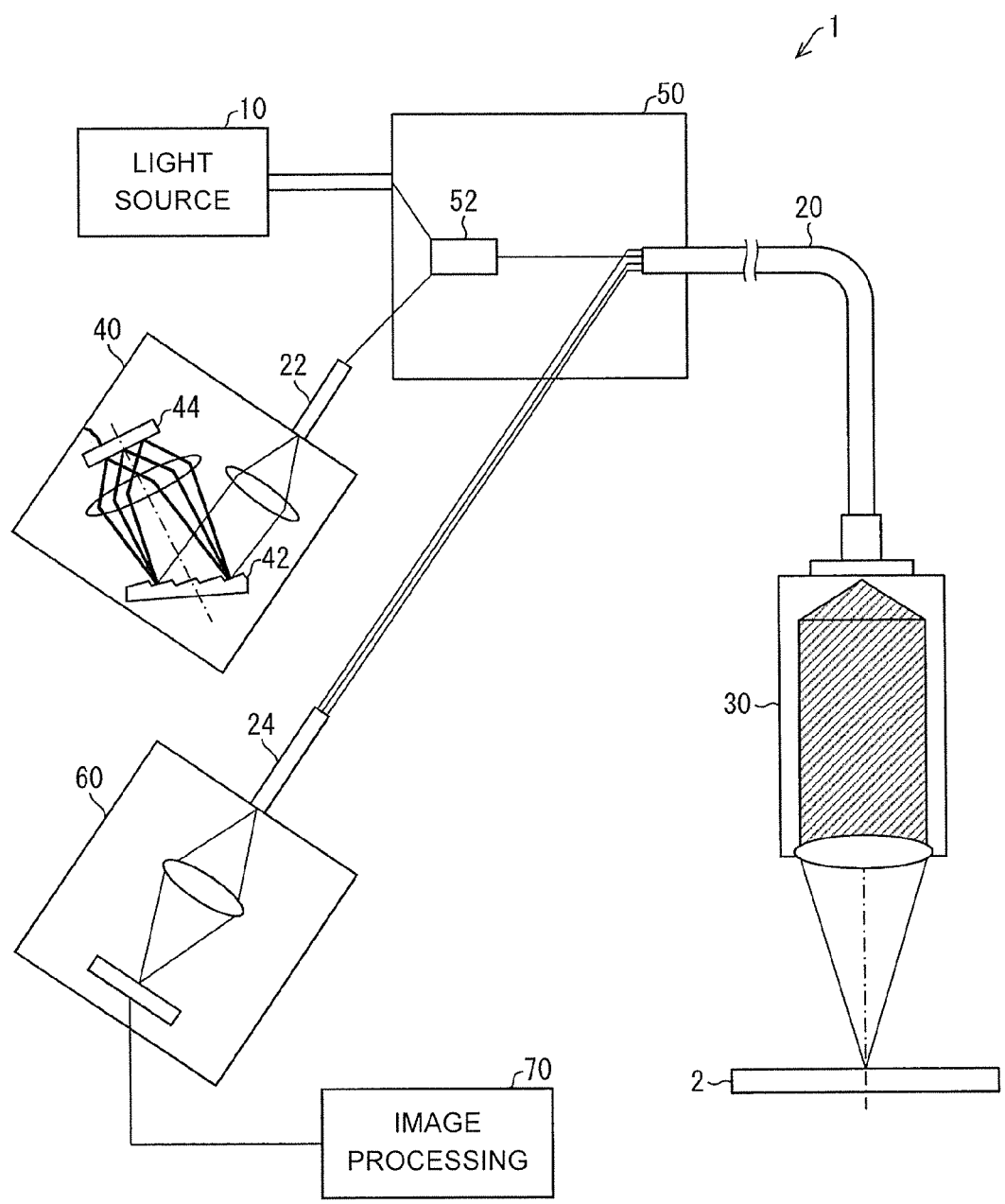
FIG. 3 is a schematic view illustrating an example of an apparatus configuration of a confocal measuring apparatus according to a second embodiment of the invention.

A configuration of the confocal measuring apparatus 1 according to a second embodiment of the invention will be described with reference to FIG. 3. FIG. 3 is a schematic view illustrating an example of an apparatus configuration of the confocal measuring apparatus 1 according to the embodiment.

In the embodiment, a basic configuration of the confocal measuring apparatus 1 is the same as that of the first embodiment, but it further includes an image processing part 70.

The image processing part 70 may calculate a degree of inclination of the measurement surface of the object 2 to be measured on the basis of the peripheral image with respect to the measurement point which is taken by the peripheral image measurement part 60. Specifically, the image processing part 70 may calculate the degree of inclination of the measurement surface on the basis of a distribution of the intensity for each wavelength of the reflected light incident to the respective image pickup element in the images formed on the plurality of image pickup elements.

Method of Calculating Degree of Inclination

A method of calculating the degree of inclination of the measurement surface on the basis of the peripheral image with respect to the measurement point, which is performed by the image processing part 70, will be described below.

In the peripheral image measurement part 60, the reflected light from the measurement surface is detected by the image pickup elements two-dimensionally arranged on the image pickup surface, and the reflected light generates chromatic aberration on the optical axis for each wavelength. At this time, for example, when the light receiving surface of the sensor head 30 and the measurement surface are parallel to each other, the distance $d_i$ between the light receiving surface of the sensor head 30 and the measurement surface is constant at an arbitrary position on the measurement surface. This means that, when the reflected light is received by the image pickup surface, the wavelength of the light in which a light receiving amount is maximum is constant in the plurality of image pickup elements located at an arbitrary position on the image pickup surface.

However, for example, when the measurement surface is inclined with respect to the light receiving surface of the sensor head 30, the distance $d_i$ between the light receiving surface of the sensor head 30 and the measurement surface has different values at different positions on the measurement surface. This means that, when the reflected light is received by the image pickup surface, the wavelength of the light in which the light receiving amount is a maximum is different between the plurality of image pickup elements located at different positions on the image pickup surface. Therefore, a distribution of the distance $d_i$ between the light receiving surface of the sensor head 30 and the measurement surface may be obtained on the basis of a distribution of the wavelength of the light, in which the light receiving amount is a maximum, for each image pickup element on the image pickup surface. Specifically, since the distance $d_i$ may be calculated from the wavelength of the light corresponding to a pixel having the maximum light receiving amount among three pixels of RGB (red, green and blue) forming the image pickup element, it is possible to obtain the distribution of the distance $d_i$ by calculating the distance $d_i$ for each image pickup element.

Furthermore, the degree of inclination of the measurement surface may be calculated from the distribution of the distance $d_i$. For example, two different positions on the measurement surface may be assumed to be a position A and a position B, respectively. Further, it may be assumed that a distance between the position A and the light receiving surface of the sensor head 30 and a distance between the position B and the light receiving surface of the sensor head 30 are $d_A$ and $d_B$, respectively, and a distance between the position A and the position B is L. At this time, a degree θ of inclination between the position A and the position B may be calculated by $θ=\arctan((d_A-d_B)/L)$. Also, the distance L may be obtained from a distance on the image pickup surface corresponding to each of the position A and the position B.

According to the above-described method, the image processing part 70 may calculate the degree of inclination between the position A and the position B. Further, since the position A and the position B may be any positions on the measurement surface, the degree of inclination of the entire measurement surface may be calculated by applying the above-described method at a plurality of positions on the measurement surface. Therefore, in the embodiment, the confocal measuring apparatus 1 can calculate the degree of inclination of the measurement surface using the image processing part 70.

Specific Example of Operation

The operation of the confocal measuring apparatus 1 according to the embodiment will be specifically described with reference to FIG. 3.

The operation in which the measurement surface is irradiated with the irradiation light generated by the light source 10 and the distance $d_i$ between the light receiving surface of the sensor head 30 and the measurement point is calculated on the basis of the reflected light from the measurement surface and the operation in which the peripheral image with respect to the measurement point is captured are the same as those in the first embodiment.

The image processing part 70 calculates the degree of inclination of the measurement surface on the basis of the peripheral image with respect to the measurement point captured by the peripheral image measurement part 60. Further, the calculation result may be output together with the distance $d_i$ and the peripheral image with respect to the measurement point.

Due to such an operation, the confocal measuring apparatus 1 according to the embodiment may obtain the distance $d_i$ between the light receiving surface of the sensor head 30 and the measurement point and may obtain the peripheral image with respect to the measurement point. Further the degree of inclination of the measurement surface may be calculated on the basis of the peripheral image with respect to the measurement point. Accordingly, for example, the user may rearrange the object 2 to be measured so as to correct the calculated degree of inclination. Therefore, it is possible to provide the confocal measuring apparatus 1 which captures the peripheral image with respect to a measurement position and calculates the degree of inclination of the corresponding region.

Third Embodiment

Configuration of Confocal Measuring Apparatus

Figure 4:
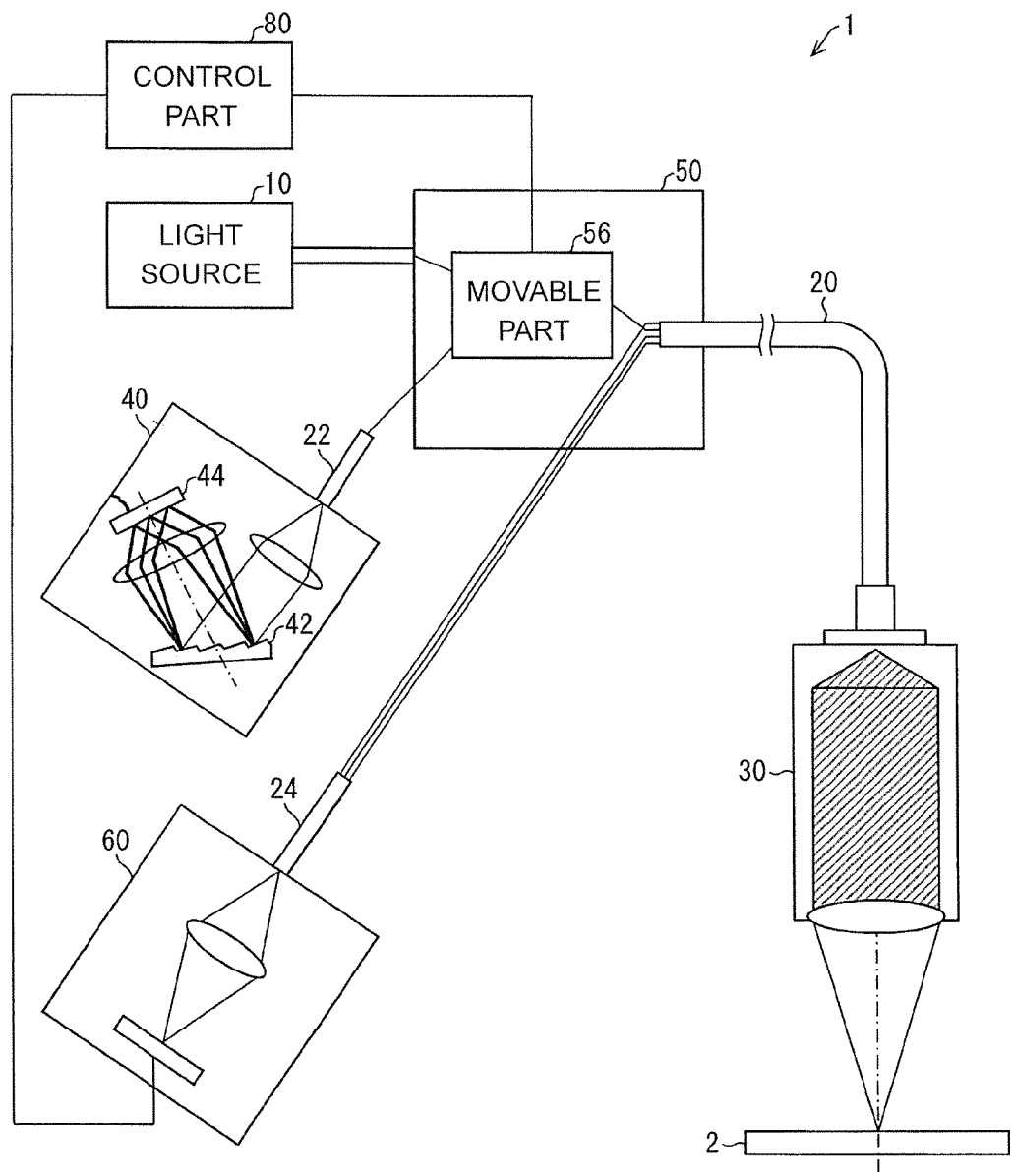
FIG. 4 is a schematic view illustrating an example of an apparatus configuration of a confocal measuring apparatus according to a third embodiment of the invention.

A configuration of the confocal measuring apparatus 1 according to a third embodiment of the invention will be described with reference to FIG. 4. FIG. 4 is a schematic view illustrating an example of an apparatus configuration of the confocal measuring apparatus 1 according to the embodiment.

In the embodiment, a basic configuration of the confocal measuring apparatus 1 is the same as that of the first embodiment, but the confocal measuring apparatus 1 includes a control part 80, and a part of the configuration of the fiber core selection part 50 is different.

The control part 80 may integrate and control each part of the confocal measuring apparatus 1. In the embodiment, the control part 80 may control movement of a movable part 56 and may arbitrarily select a core, which will be used as the first core 26, from the plurality of cores of the light guide part 20. For example, the control part 80 may connect some of the plurality of cores provided in the light guide part 20 to the movable part 56 in advance. Additionally, by controlling the movement of the movable part 56, it is possible to select a specific one of the plurality of cores as the first core 26 and to obtain the distance $d_i$ for the first core 26. Also, the peripheral image with respect to the measurement point may be acquired using the first core 26.

The fiber core selection part 50 is different from that in the first embodiment in that the movable part 56 is provided. The same as in the configuration using the coupler 52 in the first embodiment, the movable part 56 makes the irradiation light from the light source 10 to incident to the light guide part 20, and in the reflected light from the measurement surface, the reflected light propagated through the first core 26 is incident to the displacement amount measurement core 22. Further, the movable part 56 has a configuration in which the first core 26 may be arbitrarily selected from the plurality of cores of the light guide part 20 by moving a relative position with respect to the light guide part 20 according to control of the control part 80. For example, the movable part 56 may include the coupler 52 and may further include an actuator capable of changing an orientation of the coupler 52. At this time, the coupler 52 may shift the core of the light guide part 20, which is optically connected, by driving the actuator. Accordingly, the core used as the first core 26 can be arbitrarily selected from the plurality of cores of the light guide part 20.

Specific Example of Operation

The operation of the confocal measuring apparatus 1 according to the embodiment will be specifically described with reference to FIG. 4.

First, the control part 80 selects an arbitrary core from the plurality of cores of the light guide part 20 as the first core 26 and drives the movable part 56 to receive the reflected light propagated through the first core.

After that, the operation in which the measurement surface is irradiated with the irradiation light generated by the light source 10 and the distance $d_i$ between the light receiving surface of the sensor head 30 and the measurement point is calculated on the basis of the reflected light from the measurement surface and the operation in which the peripheral image with respect to the measurement point is captured are the same as those in the first embodiment.

Due to such an operation, the confocal measuring apparatus 1 according to the embodiment may obtain both of the distance $d_i$ between the light receiving surface of the sensor head 30 and the measurement point and the peripheral image with respect to the measurement point using the specific core. Accordingly, for example, the user may obtain the distance $d_i$ at a desired nearby position on the basis of the peripheral image with respect to the measurement point. Therefore, it is possible to provide the confocal measuring apparatus 1 which captures the peripheral image with respect to a measurement position and calculates the distance $d_i$ between the light receiving surface of the sensor head 30 and the measurement point at a desired position.

Others

In each of the above-described embodiments, when the first core 26 is set to a plurality of cores, since the accuracy of the calculated distance $d_i$ may be increased but the radius of the measurement region is increased, this is not suitable for measurement of a minute region. Therefore, for example, the confocal measuring apparatus 1 may have a configuration in which it is possible to change the number of cores assigned to the first core 26 according to a shape of the object 2 to be measured and a size of the desired region to be measured.

Example of Implementation by Software

A control block (in particular, the image processing part 70 and the control part 80) of the confocal measuring apparatus 1 may be realized by a logic circuit (hardware) formed in an integrated circuit (IC chip) or the like and may be realized by software using a central processing unit (CPU).

In the latter case, the confocal measuring apparatus 1 includes a CPU which executes an instruction of a program which is software for realizing each function, a read only memory (ROM) or a memory device (these are referred to as "recording medium") in which the program and a variety of data are recorded to be readable by a computer (or CPU), and a random access memory (RAM) which develops the above-described program. Additionally, the object of an embodiment of the invention is achieved by the computer (or CPU) reading the program from the recording medium and executing the program. As the recording medium, "a non-transitory tangible medium", for example, a tape, a disk, a card, a semiconductor memory, a programmable logic circuit, or the like can be used. Further, the program may be supplied to the computer via an arbitrary transmission medium (a communication network, a broadcast wave or the like) capable of transmitting the program. Also, one aspect of an embodiment of the invention may also be realized in the form of a data signal embedded in a carrier wave in which the program is embodied by electronic transmission.

The disclosure is not limited to each of the above-described embodiments, and various modifications are possible within the scope indicated in the claims, and embodiments obtained by appropriately combining technical means disclosed in other embodiments are also included in the technical scope of the disclosure.

Summary

A confocal measuring apparatus 1 according to a first aspect of an embodiment of the invention includes a light source 10, an optical system (sensor head 30) disposed with respect to irradiation light from the light source, and configured to irradiate an object 2 to be measured with the irradiation light and to receive reflected light from a measurement surface of the object to be measured, a light guide part 20 into which a plurality of cores including a first core 26 and a second core 28 is built and configured to propagate the reflected light incident to the optical system by the plurality of cores, a displacement amount measurement part 40 including a spectroscope 42 configured to separate the reflected light propagated by the first core into each wavelength component and a detector 44 having a plurality of light receiving elements arranged to correspond to a spectral direction by the spectroscope, and a peripheral image measurement part 60 including a plurality of image pickup elements and configured to form an image of the reflected light propagated by the second core on the plurality of image pickup elements and to generate a peripheral image with respect to a measurement position of the measurement surface.

According to the above-described configuration, the confocal measuring apparatus can obtain the distribution of the intensity of the reflected light and the peripheral image with respect to the measurement position of the measurement surface using the reflected light. Therefore, the user can confirm whether or not an intended position on the measurement surface has been measured. Further, since the peripheral image with respect to the measurement position is generated on the basis of the reflected light propagated through the second core, there is no restriction necessary for obtaining the peripheral image. Accordingly, even when the distance between the sensor head and the measurement surface is short and the periphery of the measurement position is hidden in the shadow of the sensor head, the peripheral image with respect to the measurement position can be obtained. Therefore, it is possible to provide a convenient confocal measuring apparatus capable of confirming the peripheral image with respect to the measurement position without being influenced by the relative position between the sensor head and the measurement surface.

In the first aspect, a confocal measuring apparatus 1 according to a second aspect of an embodiment of the invention may have a configuration in which the displacement amount measurement part calculates a distance from the optical system (sensor head 30) to the measurement surface of the object 2 to be measured on the basis of a detection result of the detector 44.

According to the above-described configuration, the confocal measuring apparatus can calculate the distance from the optical system to the measurement surface. Thus, the user can check the peripheral image with respect to the measurement position and the distance from the optical surface to the measurement surface.

In the first or second aspect, a confocal measuring apparatus 1 according to a third aspect of an embodiment of the invention may have a configuration in which further includes an image processing part 70 configured to calculate a degree of inclination of the measurement surface on the basis of a distribution of an intensity for each wavelength of the reflected light incident to each of a plurality of image pickup elements in an image formed on the plurality of image pickup elements by the peripheral image measurement part 60.

According to the above-described configuration, it is possible to calculate the degree of inclination of the measurement surface on the basis of the distribution of the intensity for each wavelength in the peripheral image with respect to the measurement position. Accordingly, the user can check the degree of inclination of the measurement surface from the image.

In any one of the first to third aspects, a confocal measuring apparatus 1 according to a fourth aspect of an embodiment of the invention may have a movable part 56 and a control part 80. The movable part 56 is movable with respect to a relative position of the light guide part 20. The control part 80 is configured to control movement of the movable part to select the first core 26 from among the plurality of cores.

According to the above-described configuration, it is possible to appropriately select the first core from the plurality of cores by controlling the movable portion with the control part. Accordingly, it is possible to change the measurement position within a range of the peripheral image with respect to the measurement position. For example, even when the object to be measured is placed at an appropriate position with respect to the sensor head, it is possible to control a desired position such that it is a measurement position on the basis of the peripheral image with respect to the measurement point.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A confocal measuring apparatus, comprising:
a light source,
an optical system disposed with respect to irradiation light from the light source, and configured to irradiate an object to be measured with the irradiation light and to receive reflected light from a measurement surface of the object to be measured,
a movable part disposed between the light source and the optical system,
a control part connected to the movable part,
a light guide part in which a plurality of cores including a first core and a second core is built and configured to propagate the reflected light incident to the optical system by the plurality of cores, wherein the light guide part is disposed between the movable part and the optical system, and the first core is selected by controlling a movement of the movable part through the control part, wherein the first core and the second core are respectively extended toward different directions in a non-parallel manner, a displacement amount measurement part, physically connected to the first core, including a spectroscope configured to separate the reflected light propagated by the first core into each of wavelength components and a detector having a plurality of light receiving elements arranged to correspond to a spectral direction of the spectroscope, wherein the displacement amount measurement part is configured to measure a distance between the optical system and a measurement position on the measurement surface, and a peripheral image measurement part, physically connected to the second core, including a plurality of image pickup elements and configured to form an image of the reflected light propagated by the second core on the plurality of image pickup elements and to generate a peripheral image with respect to a measurement position on the measurement surface, wherein the displacement amount measurement part and the peripheral image measurement part are respectively disposed along different propagating directions of the reflected light from the first core and the second core.

2. The confocal measuring apparatus according to claim 1, wherein the displacement amount measurement part calculates a distance from the optical system to the measurement surface of the object to be measured on the basis of a detection result of the detector.

3. The confocal measuring apparatus according to claim 1, further comprising an image processing part configured to calculate a degree of inclination of the measurement surface on the basis of a distribution of an intensity for each wavelength of the reflected light incident to each of the plurality of image pickup elements in an image formed on the plurality of image pickup elements by the peripheral image measurement part.

4. The confocal measuring apparatus according to claim 2, further comprising an image processing part configured to calculate a degree of inclination of the measurement surface on the basis of a distribution of an intensity for each wavelength of the reflected light incident to each of the plurality of image pickup elements in an image formed on the plurality of image pickup elements by the peripheral image measurement part.

5. The confocal measuring apparatus according to claim 1, wherein
the movable part is configured to be movable with respect to a relative position of the light guide part; and
the control part is configured to control movement of the movable part such that the first core is selected from among the plurality of cores.

6. The confocal measuring apparatus according to claim 2, wherein
the movable part is configured to be movable with respect to a relative position of the light guide part; and
the control part is configured to control movement of the movable part such that the first core is selected from among the plurality of cores.

7. The confocal measuring apparatus according to claim 3, wherein
the movable part is configured to be movable with respect to a relative position of the light guide part; and
the control part is configured to control movement of the movable part such that the first core is selected from among the plurality of cores.

8. The confocal measuring apparatus according to claim 4, wherein
the movable part is configured to be movable with respect to a relative position of the light guide part; and
the control part is configured to control movement of the movable part such that the first core is selected from among the plurality of cores.

* * * * *